United States Patent [19]

Lee

[11] Patent Number: 5,692,180

[45] Date of Patent: Nov. 25, 1997

[54] OBJECT-ORIENTED CELL DIRECTORY DATABASE FOR A DISTRIBUTED COMPUTING ENVIRONMENT

[75] Inventor: Henry Lee, Austin, Tex.

[73] Assignee: International Business Machines Corporation, Austin, Tex.

[21] Appl. No.: 381,259

[22] Filed: Jan. 31, 1995

[51] Int. Cl.⁶ .................................................. G06F 15/00
[52] U.S. Cl. ........................ 395/610; 395/611; 395/614; 395/200.03; 395/200.08; 395/444
[58] Field of Search ...................... 395/200.06, 200.03, 395/200.09, 200.1, 200.11, 601, 602, 603, 610, 614, 200.08, 611, 444

[56] References Cited

U.S. PATENT DOCUMENTS

| | | | |
|---|---|---|---|
| 5,257,369 | 10/1993 | Skeen et al. | 395/680 |
| 5,261,098 | 11/1993 | Katin et al. | 395/650 |
| 5,265,206 | 11/1993 | Shackelford et al. | 359/200 |
| 5,270,712 | 12/1993 | Iyer et al. | 341/50 |
| 5,287,507 | 2/1994 | Hamilton et al. | 395/650 |
| 5,291,593 | 3/1994 | Abraham et al. | 395/600 |
| 5,313,630 | 5/1994 | Namioka et al. | 395/600 |
| 5,325,524 | 6/1994 | Black et al. | 395/600 |
| 5,341,478 | 8/1994 | Travis, Jr. et al. | 395/200.03 |
| 5,367,635 | 11/1994 | Bauer et al. | 395/200 |
| 5,377,323 | 12/1994 | Vasudevan | 395/200 |
| 5,423,034 | 6/1995 | Cohen-Levy et al. | 395/600 |
| 5,452,459 | 9/1995 | Drury et al. | 395/700 |
| 5,455,951 | 10/1995 | Bolton et al. | 395/700 |
| 5,483,652 | 1/1996 | Sudama et al. | 395/600 |
| 5,491,791 | 2/1996 | Glowny et al. | 395/183.13 |
| 5,500,929 | 3/1996 | Dickinson | 395/160 |
| 5,548,726 | 8/1996 | Pettus | 395/200.09 |

Primary Examiner—Thomas G. Black
Assistant Examiner—Jean Raymond Homere
Attorney, Agent, or Firm—Jeffrey S. LaBaw; David H. Judson

[57] ABSTRACT

A memory for storing data for access by an application program being executed in a processing system of a distributed computing environment includes an object-oriented data structure. The data structure include a plurality of base data objects having predetermined instances including a directory object and an entry object, and a plurality of attribute data objects storing information about particular resources. The plurality of base and attribute data objects are configurable into a namespace, e.g., a tree structure, that enables the application program to locate resources in the distributed computing environment. The predetermined instances of the base data objects may also include a link object that points to another object in the tree structure, thereby transforming the namespace into a directed graph.

17 Claims, 3 Drawing Sheets

```
                    class cdsAttr {
                        cdsAttr *next;
                        friend class cdsBase;
                        char *value;
                 56 { public:
                        { char *attrname;
                     58{ cdsAttrType_t attrtype;
                        { cdsAttr (char* name, char* value, int len);
                        { cdsAttr ();
                    };
```

FIG. 7

```
    class cdsBase {
    protected:
        char *name;
        char *simple;
        cdsAttr *firstAttr;
        cdsAttr *lastAttr;
    42{ cdsBase *parent;
        cdsBase *first;
        cdsBase *last;
        pthread_mutex_t lock;
        cdsEntries_t type;
    public:
        cdsBase (char *name, cdsBase *parent = 0);
        cdsBase ();
        void insert (cdsAttr *attr);
        void insertbefore (cdsAttr *attr, cdsAttr *cts);
        void append (cdsAttr *attr);
        void detach (cdsAttr *attr);
        void insert (cdsBase *obj);
        void append (cdsBase *obj);
   46{  void finddetach (cdsAttr *attr); // detach
    duplicates
        void sortedinsert (cdsBase *obj);
        void detach();
        void detach (char *name);

48{ cdsAttr *find (char *name, char *value);
       cdsBase *find (char *name);
        cdsAttr *count (char *name, long int *handle_);
        cesAttr *count (long int *handle_, cdsAttrType
    t *type);                                              }50
        cdsBase *count (long int *handle, cdsEntries_t
    entrytype);

int writefile (FILE *f);
        int writefile ();                                  }52
        static int readfile ();
        cdsEntries_t entrytype (char **moreinfo);
        int emptychild();

static cdsBase *parsecreate (char *name, int
    *status)                                               }54
        static cdsBase *parsefind (char *name, edsBase
    **softlink = 0);
    }
```

FIG. 6

OBJECT-ORIENTED CELL DIRECTORY DATABASE FOR A DISTRIBUTED COMPUTING ENVIRONMENT

TECHNICAL FIELD

The present invention relates generally to the task of locating resources in a distributed computing environment and more particularly to an object-oriented distributed database which stores locations and other identifying information of application servers in the distributed environment.

BACKGROUND OF THE INVENTION

It is well known in the art to interconnect multiple computers into a local area network (LAN) to enable such computers to exchange information and share resources. A local area network provides a distributed computing environment in which users can access distributed resources and process applications on multiple computers.

In a distributed environment, there is a need for a consistent way to identify and locate resources in the network. Known directory naming services provide distributed applications with a place to store and find information about network resources. Typically, the directory service is used to provide distributed application clients with a remote server's network address. After obtaining the server's network address, the client would typically contact the server to perform some service.

Prior directory naming services enable network administrators to impose a hierarchy with a group of machines located within a "cell". One such service includes software code provided by the Open Systems Foundation (OSF). In the OSF Distributed Computing Environment (DCE) Cell Directory Service (CDS), name information is copied into multiple servers located near the users most likely to need the information. Such information is copied through a process called replication. Administrators create copies or "replicas" of name directories and place them in so-called clearinghouses. A clearinghouse is the name database managed by a CDS server and generally includes only those replicas needed by nearby users. Because a cell's name environment is usually distributed across multiple clearinghouses, the service provides a mechanism to enable servers to find every directory in the environment.

In prior art CDS schemes, name entries in the distributed database are supported in a flat list of names, and the names are typically quite long. Name retrieval typically involves taking a relatively long name and looking it up in a hash table. As a result, name retrieval is typically quite slow. Moreover, due to replication and the accompanying need to support replicas in multiple clearinghouses, the size of the distributed database is often large. This is undesirable when the cell size is small, e.g., 15-20 machines.

There is therefore a need to provide a distributed database architecture for a relatively small-sized DCE cell that overcomes these and other problems associated with prior directory services.

BRIEF SUMMARY OF THE INVENTION

It is therefore a principal object of the invention to provide a new distributed database structure to enable location of resources in a distributed computing environment.

It is a more particular object of the invention to provide an object-oriented database structure to store locations and other identifying information of application servers in a distributed computing environment.

It is a further object of the invention to provide such an object-oriented cell directory database to facilitate a cell directory service, preferably without replication.

It is still another object of the invention to provide a database structure for a distributed computing environment that is relatively small in size yet still provides efficient name retrieval.

It is yet another object to implement a DCE naming service using object-oriented database methods.

According to the invention, every resource in the cell has a unique name. These names are actually objects in memory, and the objects are organized into a namespace. Each object may include attributes that detail information about the resource. To facilitate the directory service, each object is structured into one of several types, a directory, a link or an entry, and objects are organized into a tree structure that is configurable into a directed graph. A directory object is a container to hold resource names, names of other directories or names of other object types. A link object is used to point to another name, so that a reference to the link actually returns references to the link's target. An entry object is a leaf object in a naming tree.

Preferably, the common qualities of the three types of objects are abstracted into a common base object. Each base object contains a list of children, and a parent pointer. These elements enable the base objects to be organized into the tree structure. By adding link objects, the tree structure may be transformed into a general directed graph. Children of a base object are strung together in a singly linked-list structure.

Each base object may contain zero or more attributes, with each attribute modeled by another type of object, referred to as an "attribute object." Attribute objects are also strung together in a singly linked-list. Together, the base objects and the attribute objects form the entire namespace. With this database structure, directory service information retrieval is very efficient.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 6 is a representative common base object cdsBase according to the invention; and FIG. 7 is a representative attribute object cdsAttr according to the invention.

DETAILED DESCRIPTION

Figure 1:
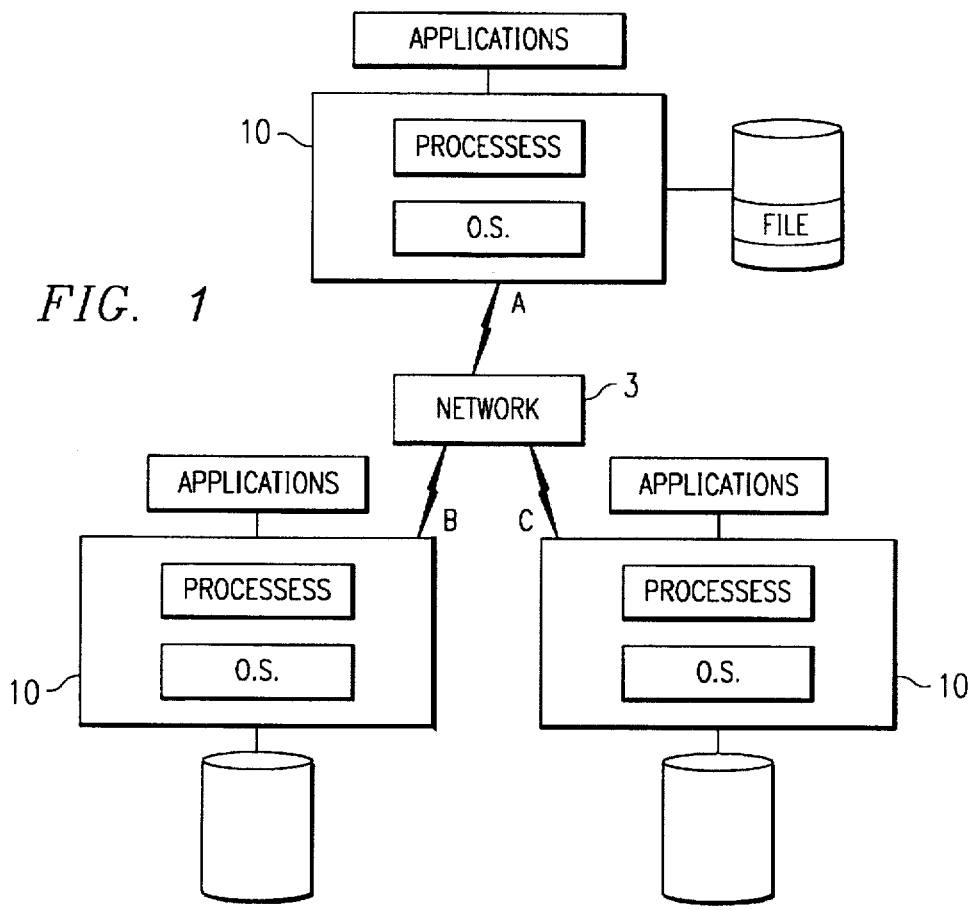
FIG. 1 illustrates a computer network in which the present invention is implemented.

A known distributed computing environment (DCE) is illustrated in FIG. 1 and includes two or more nodes A, B and C connected through a communication link or network 3. The network 3 can be a local area network (LAN) or a wide area network (WAN), the latter comprising a switched or leased teleprocessing (TP) connection to other nodes or to a network of systems operating under a known computer architecture. At any of the nodes A, B or C there may be a processing system 10A, 10B or 10C. Each of these systems may be a single user system or a multi-user system. Each of the processing systems may operate as a client or server, depending on whether it is requesting or supplying services. Typically, a client includes at least one process that requests a service from a server process using a remote procedure call (RPC). In response to an RPC, a cell directory service daemon (CDSD) returns a so-called "server binding handle" specifying the location of the server process as a network address and perhaps the port number where the server process is running. The server process is normally identifed upon the first RPC call. Other information about the server that is available from the cell directory service may also be returned. The binding handle is then used by the RPC mechanism to define a communication path between the client process and the server process.

Each of the processing systems is a computer. For example, each computer may be an IBM® PS/2® running under the OS/2® operating system. For more information on the PS/2® line of computers and the OS/2® operating system, the reader is directed to *Technical Reference Manual Personal Systems/2 Model 50, 60 Systems IBM Corporation*, Part No. 68x2224 Order Number S68X-2224 and *OS/2® 2.0 Technical Library, Programming Guide* Volumes 1–3 Version 2.00, Order Nos. 10G6261, 10G6495 and 10G6494. Or each computer may be a RISC System/6000® (a reduced instruction set or so-called RISC-based workstation) running the AIX® (Advanced Interactive Executive) operating system. The AIX®operating system is compatible at the application interface level with AT&T's UNIX operating system, version 5.2. The various models of the RISC-based personal computers are described in many publications of the IBM Corporation, for example, *RISC System/6000, 7073 and 7016 POWERstation and POWERserver Hardware Technical Reference*, Order No. SA23-2644-00. The AIX® operating system is described in *AIX Operating System Technical Reference*, published by IBM Corporation, First Edition (November, 1985), and other publications. A detailed description of the design of the UNIX operating system is found in a book by Maurice J. Bach, *Design of the Unix Operating System*, published by Prentice-Hall (1986).

In one particular implementation, the invention runs on a plurality of IBM RISC System/6000 machines interconnected by IBM's Transmission Control Protocol/Internet Protocol (TCP/IP) architecture. TCP/IP uses as its link level Ethernet, a local area network (LAN) developed by Xerox Corporation. A simplified description of local area networks may be found in a book by Larry E. Jordan and Bruce Churchill entitled *Communications and Networking for the IBM PC*, published by Robert J. Brady (a Prentice-Hall Company)(1983). Although the invention is described in the above-identified context, it should be appreciated that the teachings herein may be implemented using other and different computers interconnected by other networks than the Ethernet LAN or IBM's TCP/IP.

Figure 2:
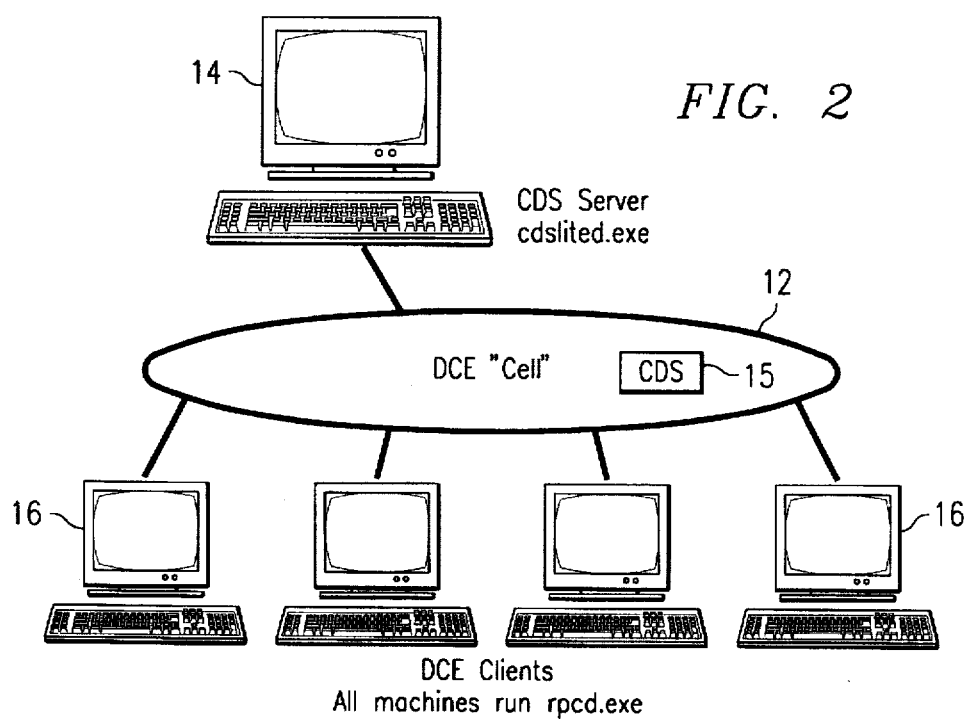
FIG. 2 illustrates a representative cell of connected machines in which the invention is implemented.

Preferably, the invention is implemented in a distributed computing environment cell having a relatively small number (e.g., less than 25) machines. FIG. 2 shows a representative DCE cell 12 in which the present invention is implemented. The cell 12 consists of a set of connected machines sharing a common cell name and namespace. In this representative system, a DCE application enabler routine provides an environment to develop and run DCE-complaint distributed applications under the operating system (e.g., OS/2) without requiring the full DCE core services. The cell comprises the CDS server 14 and the DCE clients 16. The set of connected machines share a common cell name, and a unified "namespace". Each cell provides a location independent namespace service called CDS, or Cell Directory Service 15. The naming service is used by application servers to store their location and interfaces, known as server bindings.

Figure 3:
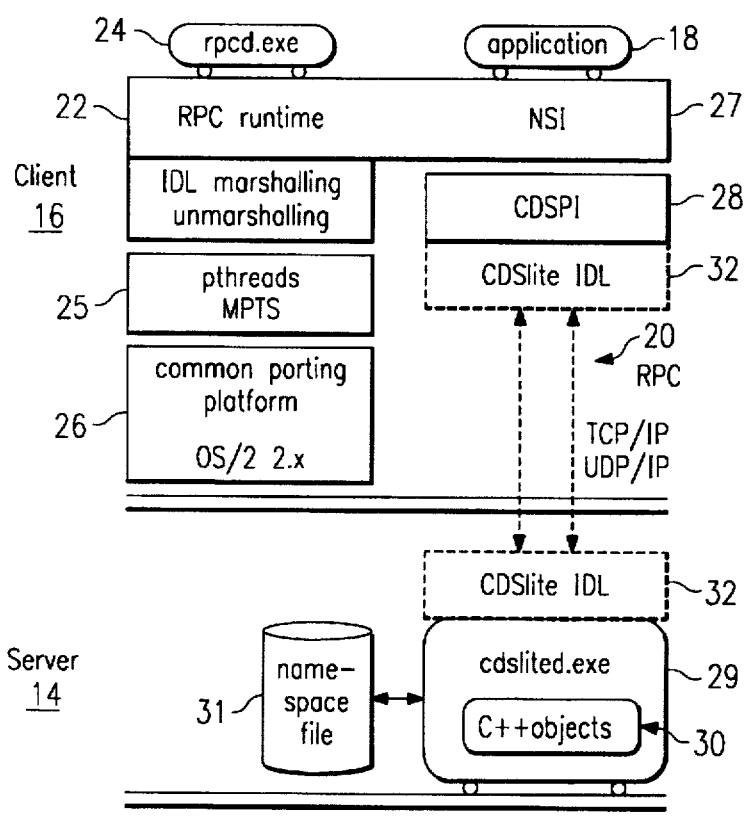
FIG. 3 is a detailed illustration showing how a client communicates with the name server of the cell to access an object-oriented namespace.

FIG. 3 illustrates the system architecture in more detail to show how one of the DCE clients 16 communicates with the server 14. It is assumed that application 18 is running on client 16 and needs a service provided by a network device. Information about that device (such as its location) is obtained for the application from the CDS by having the client issue an RPC 20 to the server 14 using the conventional RPC mechanism (including RPC runtime 22 and rpcd.exe 24) and returning the results to the application. The client 16 also includes a transport layer 25 running above the operating system 26, and a name service independence (NSI) mechanism 27.

According to the invention, the resource naming information is stored in the namespace of the invention using an object-oriented cell directory database. There is one daemon running the cell, called cdslited 29, which provides a centralized mechanism to access the namespace 30. The names and server bindings are located in the memory of the cdslited daemon, and the namespace is occasionally checkpointed to a file 31. The CDS daemon cdslited enables access to methods that create, add, delete and modify names and other information in the objects. The methods comprise the known OSF CDS Programming Interface (CDSPI) 28.

The server 14 supports the namespace in suitable "memory" 30. There is an interface 32 between the DCE client and the CDS name server cdslited. The interface is written and formalized in OSF/DCE interface definition language (IDL). DCE applications requiring CDS data communicate with the cdslited daemon via RPC's passed through the transport transport (TCP or UDP) layer and the network (IP) layer. The declarations for the RPC's are detailed in a file called cdslite.idl, written in OSF/DCE IDL. This idl file is then used to generate the necessary client and server stubs. The client stub is linked as part of the DCE CDS library, and communicates with the server stub. The server stub is linked as part of cdslited.exe and listens for RPC's.

The IDL routines are methods to manipulate CDS objects and CDS attributes. As will be seen in more detail below, the naming consists of the prefix "cdsBase" to denote an action or method on a CDS object, and "cdsAttr" for a CDS attribute. The first parameter in the call is the RPC binding handle, which contains information about how to reach the cdslited daemon. The CDS library handles initialization of the binding handle before making any RPC calls.

According to the invention, the distributed database for use by the cell directory service daemon is structured in an object-oriented manner to provide processing efficiencies over known techniques. For background information on object-oriented concepts and conventions, the reader is directed to various publications such as *Object Oriented Design With Applications*, by Grady Booch (The Benjamin/ Cummings Publishing Company, 1990) and *Object Oriented Software Construction*, by B. Meyer, (Prentice Hall, 1988).

As described generally above, the database of names and other server information is stored in a namespace defining a tree structure that is configurable into a directed graph. The database provides DCE distributed applications with a place to store and find information about resources available in the cell. One representative use of the database is to provide DCE distributed application clients with a remote server's network address. Besides server location information, the naming service may provide other information including, without limitation, the server's name, the protocols supported by a server, the types of services available, and other interface information. This information is exported to the directory server whenever an application server starts up.

Every resource (typically an application server) in the cell has a unique name. According to the invention, the names are preferably objects in memory formatted under C++ programming language conventions. Although not meant to be limiting, the namespace provides for the following types of objects: CDS directory, CDS link and CDS entry. A CDS directory is a container to hold additional names, links or entries, or references to subdirectories. A CDS directory contains zero or more children. A link object is used to point to another name so that references to the link returns a reference to the link's target. An entry object is a leaf object in a naming tree.

The three types of objects may contain attributes. Attributes are name-value pairs which are preferably implemented as an ASCII string. Exemplary attributes of a directory object include information about when the directory was last updated, or what information in the directory is still current. Exemplary attributes in an entry object (identifying a particular server name and location) include the protocols supported by a particular server and the types of services available therefrom. The value of an attribute contains its syntax, its binary representation, and a flag indicating whether it is a "set" or "single" attribute. In a "set" attribute, the attributes with the same names can be added to a CDS object multiple times with distinct values. In a "single" attribute, a new attribute replaces an older attribute with the same name.

Therefore, CDS objects may be directories (containing other CDS objects), a link (a pointer to another CDS object), or an entry (a leaf object). A CDS object may contain zero or more attributes, and every attribute belongs to a CDS object. The common qualities of the three types of CDS objects (the directory, link and entry objects) are abstracted into a common CDS base object, described here by a C++ object called cdsBase. Each cdsBase object contains a list of children and a parent pointer. Such elements enable the cdsBase objects to be organized into a tree structure. In addition, adding link support (through the link object) allows the tree structure to transform into a more general directed graph, which may be cyclic. The children of a cdsBase object are strung together in a singly linked-list structure. As discussed above, each cdsBase object may also contain attributes, and each attribute is modeled by a C++ object called cdsAttr. The cdsAttr objects are strung together in a singly linked-list.

Figure 4:
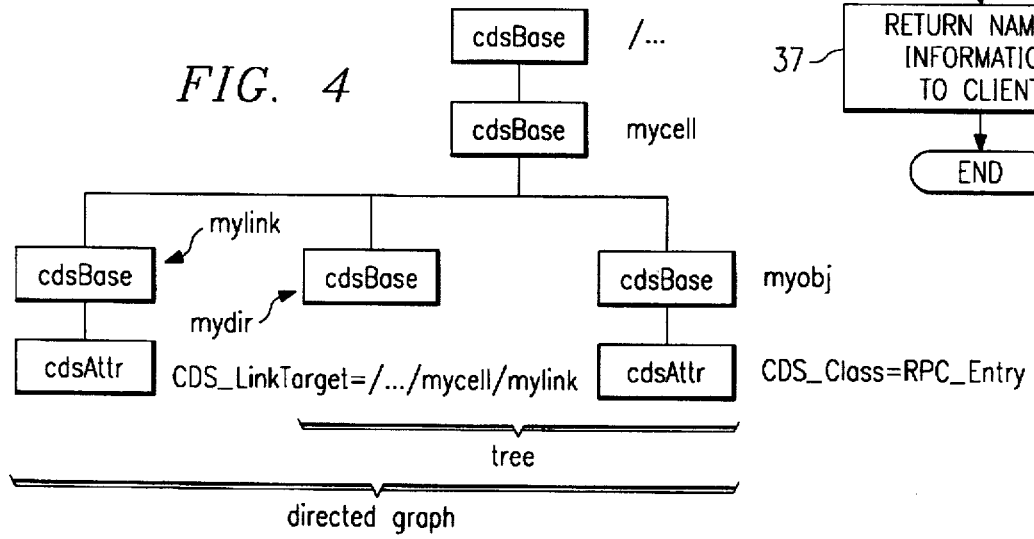
FIG. 4 illustrates a sample namespace implementing the object-oriented naming conventions of the invention.

FIG. 4 shows a representative namespace with a root directory "/. . ." and a directory "mycell" The namespace also includes a CDS entry named "/. . ./mycell/myobj" and a CDS directory named "/. . ./mycell/mydir." As can be seen, there is one attribute on entry "/. . ./mycell/myobj". The name of this attribute is "CDS_Class" and its value is the string "RPC_Entry." With the addition of link objects, the tree structure is transformable to a directed graph. A link object includes a pointer that provides an alternate for an object entry, directory or other link in the directory service database. CDS link objects restructure the directory hierarchy by pointing from an existing name to a new name. This is also illustrated in FIG. 4. In particular, the name "/. . ./mycell/mylink" is considered another name for 35 "/. . ./mycell/myobj", and there is one attribute on this object named "CDS_LinkTarget". When accessing a soft link, CDS will automatically read the CDS link target attribute and access information in the target object.

Figure 5:
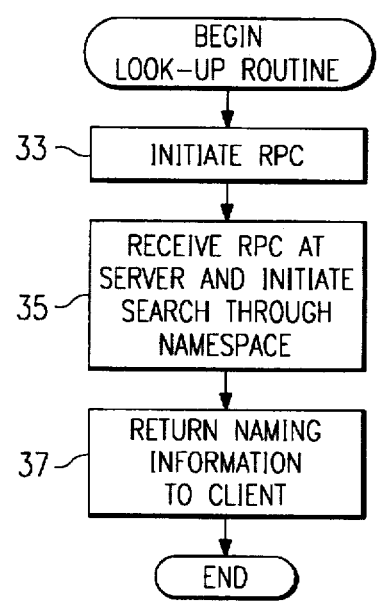
FIG. 5 is a flow diagram illustrating how an application running on a client machine in the cell obtains information about a device from the name server.

Turning now to FIG. 5, there is illustrated a method showing how the application 18 running on client 16 gets information about a device from the name server 14. At the outset, it is assumed that the database has been organized in the manner shown in FIG. 4. At step 33, an RPC is made by the client to the server. At step 35, the RPC is received at the server 14 and a directed search is initiated through the namespace to locate the binding information. The search is performed more efficiently than prior CDS schemes due to the novel organizational structure of the namespace. At step 37, the located information is returned to the client to complete the RPC.

According to the invention, the CDS namespace is implemented using two classes of objects: base objects (for directories, links and entries) and attribute objects (for attributes). In object-oriented programming, objects are categorized into classes, with a class defining the features of its objects. A feature is either a method or an attribute. Features either can be exported, i.e., other methods can call them, or features can be non-exported, i.e., they cannot be called except by a within-class method. An "instance" is a specific object with the features defined by its class. "Methods" are specific to a certain class of objects and provide certain actions (a function or procedure) on data within the object. A function is a type of code that will return a result but normally does not modify the state of the parameters given.

According to the invention, the cdsBase objects are categorized into a first "class" which define the methods of the class. The CDS directory object is a particular object instance of the cdsBase object class. Similarly, the CDS link and CDS entry objects are particular object instances of the class. The cdsAttr objects are categorized into a second class which defines the methods of that class.

FIG. 6 is a representative base object, called cdsBase (using C++ nomenclature), and FIG. 7 is a representative attribute object, called cdsAttr. The statement "class cdsBase {" identifies the object class as a cdsBase object. The second statement "protected" indicates that the data members which follow in the object cannot be accessed directly but rather must be called by a routine. Protected data members 42 include "char *name", the name of the object (whether a directory, a link or an entry), "char *simple", a shortform of the name (usually the last part of the full name), "cdsAttr *firstAttr", a pointer to a first element in a list of attributes, "cdsAttr *lastAttr", a pointer to the last element in the list of attributes, "cdsBase *parent", a pointer to a parent object (if one exists), "cdsBase *first", a pointer to a first object in a child directory, "cdsBase *last", a pointer to the last object in the child directory, "pthread_mutex_t lock", a lockout structure that allows only one thread at a time to perform an update on the object, and "cdsEntries_t type", which is an object flag identifying the object as a directory, link or object type.

The cdsBase object also include "public" data members 44. The first member "cdsBase (char *name, cdsBase *parent=0)" is a constructor statement that creates a new object with the parameters within the argument. The next member "cdsBase ( )" is a destructor statement that destroys the object. Thereafter, there is a list of "methods" which are specific to the class cdsBase objects and which provide certain actions on data within the object. A group 46 of these methods include insert, append and detach methods. Method "void insert (cdsAttr *Attr)" adds an element at the beginning of the attribute list. Method "void insertbefore (cdsAttr *Attr, cdsAttr *cts)" allows an attribute to be inserted at a position before an existing attribute in the list. The next method, "void append (cdsAttr *Attr)" puts the element at the end of the attribute list.

The public data members also include insert, append and detach methods to work on child cdsBase objects. In addition, method "void finddetach (cdsAttr *Attr)" looks for attribute names in the list and detaches them. The method "void sortedinsert (cdsBase *obj) sorts object references. Method "void detach (char *name)" looks for the character name identified in the argument and detaches it.

The cdsBase object also includes several find methods 48 to search for cdsBase or cdsAttr objects. A match is found when the input name matches the name of the object. For cdsAttr objects, it is possible to match on an attribute's value in addition to the name. The cdsBase object also includes several count methods 50 which allow iteration on a set of children cdsBase or cdsAttr objects. For example, using a handle, a current object is retrieved and the handle is updated to point to the next object.

The cdsBase object also includes writefile and readfile methods 52 which save and restore the namespace from a file. The format of the file is specified by these two methods, and the format can change without impacting any other methods. The format of the file is preferably divided into three columns, separated by tabs. The first column consists of the CDS entry name, starting with "/. . .". The second column consists of an attribute name, expressed as an ASCII string. The third column consists of the attribute type and attribute value, expressed as a set of bytes in a readable hexadecimal format.

The statement emptychild( ) determines whether a directory is empty, and the statement entrytype( ) determines whether a cdsBase object is a link, entry or directory. The utilities parsecreate( ) and parsefind( ) 54 take a full CDS name starting with "/. . ." and parse it either to create a new object or to find an existing one. These routines support ASCII based CDS names. The parse methods also update the simple name pointer, which as discussed above, generally points to the last part of a fullname. For example, if the name of an object is "/. . ./mycell/myobj", the simple name would point to "myobj" for easy retrieval.

With reference to FIG. 7, the second class of object, cdsAttr, is now described and illustrated by the header file 56. The element "cdsAttr *next" is a next element in any linked list of attributes. The statement "friend class cdsBase" allows cdsBase objects to call any routine in the cdsAttr object. The statement "char *value" is the attribute's value. The "public" elements 58 include "char *attrname", the name of the attribute, "cdsAttrType t attrtype", the attribute type ("set" or "single"), the constructor "cdsAttr (char *name, char *value, int len)", which constructs the attribute using the argument parameters, and the destructor "cdsAttr( )", which destroys the attribute object. The constuctor for cdsAttr creates a cdsAttr object from an ASCII name, a string of hexadecimal characters for its value, and a length. The name and value are allocated from free store, and are deallocated by the destructor. The cdsBase class is made a "friend" to allow access to private members. All the list manipulation is done by the cdsBase class, since the pointer named "next" is private. Further details of the cdsBase methods referred to herein can be found in DCELite Technical Evaluation, available from IBM LAN Systems, Austin, Tex., CMVC family aixdce feature 7121.

The methods and object classes described allow a robust implementation of a directory naming server without replication. In operation, the CDSPI routines are translated into method calls to these objects. When these object methods are combined with the CDSPI programming interface, they provide an OSF DCE CDS-compatible name service.

The object-oriented cell directory database of the present invention is advantageous in that there is a one-to-one correspondence or "mapping" between the way a user would consider the objects to be organized logically and how they are actually organized in memory. Thus, in the present invention, an RPC seeking information about the resource identified by, for example, "a/b/c", causes the CDS to search the namespace beginning at directory "a", which points to child directory "b", which then points to child object "c". Thus the name "a/b/c" implies the existence of three distinct objects, and that is how the objects are stored in memory. To the contrary, in the prior art, the CDS would first strip off the "c" portion of the name and then search a large directory (i.e., a hash) table for the combined string "a/b". Because multiple directories (namely directory "a" and directory "b") are represented by just a single entry in the hash table, there is no one-to-one correspondence in the prior art between the naming path and the way objects are actually supported in the memory.

According to the invention, the naming server includes a "memory" for supporting the inventive data structure which includes the plurality of data objects. The memory may be temporary (such as random access memory) or persistent (such as data files). Generalizing, the namespace may be stored in any type of computer memory, for example, in a hard disk drive, or in a removable memory such as an optical disk (for eventual use in a CD ROM) or floppy disk (for eventual use in a floppy disk drive).

Although the invention has been described in terms of a preferred embodiment in a specific operating system and network environment, those skilled in the art will recognize that the invention can be practiced, with modification, in other and different operating systems and network architectures with the spirit and scope of the appended claims. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Further, the present invention is not to be construed as limited to the OSF DCE architecture and thus in a more general sense the invention should be broadly construed to cover any network environment where distributed databases are used to locate cell resources.

Having thus described my invention, what I claim as new and desire to secure by Letters Patent is set forth in the following claims.

I claim:

1. A memory for storing data for access by application programs being executed in client machines of a distributed computing environment consisting of a small set of connected machines sharing a common name and namespace, the memory supported in a dedicated server machine of the distributed computing environment, the memory comprising:
   a data structure stored in said memory and used to emulate a directory service database optionally configured as a hierarchy of replicated directories, links and entries, the data structure including:
      a plurality of common data objects categorized into a first class and having one or more predetermined instances configurable as directories, links and entries; and
      a plurality of common data objects categorized into a second class and storing information about particular resources identified by one of the plurality of data objects in the first class;
   wherein the plurality of data objects of the first and second class are configurable into the namespace to thereby enable the application programs to locate resources in the distributed computing environment.

2. The memory as described in claim 1 wherein the namespace is a tree structure.

3. The memory as described in claim 1 wherein the namespace is a directed graph.

4. The memory as described in claim 1 wherein the predetermined instances of the data structure include a directory object that contains names of other directories.

5. The memory as described in claim 1 wherein the predetermined instances of the data structure include a link object that points to another object of the first class in the namespace.

6. The memory as described in claim 1 wherein the predetermined instances of the data structure include an entry object that identifies a resource.

7. A computer system providing a distributed computing environment in which users can access distributed resources, comprising:
   a small set of client machines;
   a dedicated server having a memory for storing data for access by applications being executed on the client machines in the distributed computing environment;
   means for organizing the memory into a predetermined data structure stored in the memory of the dedicated server and used to emulate a directory service database optionally configured as a hierarchy of replicated directories, links and entries, the predetermined data structure comprising a plurality of common data objects, wherein the plurality of common data objects are configurable into a namespace that enables the applications to locate resources in the distributed computing environment; and
   means for accessing the data in the data structure to enable the applications to locate the distributed resources.

8. The computer system as described in claim 7 wherein the accessing means interfaces to a remote procedure call mechanism supported in each client machine.

9. In a network providing a distributed computing environment in which users can access distributed resources, the network including a small set of client machines and one dedicated server having a memory, the set of client machines and the server sharing a common name and namespace, the improvement comprising:
   means for organizing data in the memory into a predetermined data structure stored in the memory of the dedicated server and used to emulate a directory service database optionally configured as a hierarchy of replicated directories, links and entries, wherein the predetermined data structure comprises a plurality of common data objects, wherein the plurality of common data objects are configurable into the namespace for enabling applications running on the client machines to locate resources in the distributed computing environment; and
   means for accessing the data in the data structure to enable the applications to locate the distributed resources.

10. In the network as described in claim 9 wherein the data structure includes:
   a plurality of data objects categorized into a first class and having one or more predetermined instances configurable as directories, links and entries; and
   a plurality of data objects categorized into a second class and storing information about particular resources identified by one of the plurality of data objects in the first class;
   wherein the plurality of data objects of the first and second class are configurable into the namespace.

11. In the network as described in claim 10 wherein the namespace of the data structure in the memory is a tree structure.

12. In the network as described in claim 10 wherein the namespace of the data structure in the memory is a directed graph.

13. In the network as described in claim 10 wherein the predetermined instances of the data structure include a directory object that contains names of other directories.

14. In the network as described in claim 10 wherein the predetermined instances of the data structure include a link object that points to another object of the first class in the namespace.

15. In the network as described in claim 10 wherein the predetermined instances of the data structure include an entry object that identifies a resource.

16. A server for use in a distributed computing environment consisting of a small set of connected machines sharing a common name and namespace, the server including a memory for storing data for access by application programs being executed in client machines of the distributed computing environment, comprising:
   a processor;
   an operating system;
   a directory service daemon; and
   a data structure stored in said memory and for use in emulating a hierarchical directory service database normally configured using directories, links and entries, including:
      a plurality of base data objects having predetermined instances configurable as directories, links and entries; and
      a plurality of attribute data objects storing information about particular resources, each of the attribute data objects being associated with at least one base data object;
   wherein the plurality of base data objects and their associated attribute data objects are configurable into the namespace to thereby enable the application programs to locate resources in the distributed computing environment.

17. The memory as described in claim 16 wherein the namespace is a tree structure.

* * * * *